US012585017B2

(12) United States Patent (10) Patent No.: US 12,585,017 B2
Pfeil (45) Date of Patent: Mar. 24, 2026

(54) METHOD FOR OPTIMIZING A SURROUNDINGS MODEL

(71) Applicant: Robert Bosch GmbH, Stuttgart (DE)

(72) Inventor: Jerg Pfeil, Cleebronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1052 days.

(21) Appl. No.: 17/618,280

(22) PCT Filed: May 7, 2020

(86) PCT No.: PCT/EP2020/062704
§ 371 (c)(1),
(2) Date: Feb. 3, 2022

(87) PCT Pub. No.: WO2020/249328
PCT Pub. Date: Dec. 17, 2020

(65) Prior Publication Data
US 2022/0413148 A1 Dec. 29, 2022

(30) Foreign Application Priority Data

Jun. 12, 2019 (DE) ..................... 10 2019 208 498.2

(51) Int. Cl.
*G01S 17/89* (2020.01)
*G01S 17/86* (2020.01)
*G01S 17/931* (2020.01)
(52) U.S. Cl.
CPC .............. *G01S 17/89* (2013.01); *G01S 17/86* (2020.01); *G01S 17/931* (2020.01)
(58) Field of Classification Search
CPC ........ G01S 17/89; G01S 17/86; G01S 17/931; G01S 13/862; G01S 13/931; G01S 17/87; G01S 13/86; G01S 13/87; G01C 21/32
See application file for complete search history.

(56) References Cited

U.S. PATENT DOCUMENTS

2010/0253595 A1* 10/2010 Szczerba ................ G02B 27/01
701/31.4
2015/0234045 A1* 8/2015 Rosenblum ........... G01S 13/931
342/70
(Continued)

FOREIGN PATENT DOCUMENTS

CN 106255899 A 12/2016
CN 108140322 A 6/2018
(Continued)

OTHER PUBLICATIONS

Translation of Ries (DE102018007658) as disclosed on IDS with only non-translated doc provided. (Year: 2018).*
(Continued)

*Primary Examiner* — Catherine T. Rastovski
*Assistant Examiner* — Toni D Sauncy
(74) *Attorney, Agent, or Firm* — NORTON ROSE FULBRIGHT US LLP

(57) ABSTRACT

A method for optimizing a surroundings model by at least one control unit, measured data being received from a first sensor set and at least one second sensor set. The first sensor set includes a first scanning area, and the second sensor set includes a second scanning area, the first scanning area and the second scanning area partially overlapping in an overlap area. A surroundings model is created for each sensor set based on the received measured data of the particular sensor set. The at least two surroundings models are compared to one another based on the overlap area and being verified. The at least two surroundings models are combined into an optimized surroundings model. A system, a control unit, a computer program, and a machine-readable memory medium, are also described.

7 Claims, 2 Drawing Sheets

(56)          References Cited

U.S. PATENT DOCUMENTS

| | | | | |
|---|---|---|---|---|
| 2017/0008562 A1* | 1/2017 | Shashua | ........... | G08G 1/096725 |
| 2017/0010104 A1* | 1/2017 | Aviel | ................. | G01C 21/3602 |
| 2017/0025019 A1* | 1/2017 | Pink | ...................... | G01S 17/931 |
| 2018/0024562 A1* | 1/2018 | Bellaiche | ................ | B60R 1/025 |
| | | | | 701/26 |

FOREIGN PATENT DOCUMENTS

| | | | |
|---|---|---|---|
| CN | 108780148 A | 11/2018 |
| CN | 109426258 A | 3/2019 |
| CN | 109863500 A | 6/2019 |
| DE | 102016212688 A1 | 1/2018 |
| DE | 102016220075 A1 | 4/2018 |
| DE | 102017203838 A1 | 9/2018 |
| DE | 102018007658 A1 | 3/2019 |
| WO | 2018235154 A1 | 12/2018 |

OTHER PUBLICATIONS

Brummelen, et. al., "Autonomous vehicle perception: The technology of today and tomorrow", Transportation Research Part C: Emerging Technologies, V 89, Apr. 2018, pp. 384-406. (Year: 2018).*

Kim, et al., "Cooperative Perception for Autonomous Vehicle Control on the Road: Motivation and Experimental Results", 2013 IEEE/RSJ International Conference on Intelligent Robots and Systems (IROS) Nov. 3-7, 2013. (Year: 2013).*

Dresner, et. al., "A Multiagent Approach to Autonomous Intersection Management", Journal of Artificial Intelligence Research 31 (2008) 591-656. (Year: 2008).*

Gruyer, et. al., "Target-to-Track Collaborative Association Combining a Laser Scanner and a Camera", Proceedings of the 16th International IEEE Annual Conference on Intelligent Transportation Systems (ITSC 2013), The Netherlands, 2013. (Year: 2013).*

Yee, et. al., "Collaborative Perception for Automated Vehicles Leveraging Vehicle-to-Vehicle Communications", 2018 IEEE Intelligent Vehicles Symposium (IV) Changshu, Suzhou, China, Jun. 26-30, 2018 (Year: 2018).*

Zhou, et. al., "On the Impact of Cooperative Autonomous Vehicles in Improving Freeway Merging: A Modified Intelligent Driver Model-Based Approach", IEEE Transactions on Intelligent Transportation Systems, vol. 18, No. 6, Jun. 2017. (Year: 2017).*

Liebner, Martin. Fahrerabsichtserkennung und Risikobewertung für warnende Fahrerassistenzsysteme. KIT Scientific Publishing, Jan. 1, 2016. Retrieved from the Internet on Dec. 10, 2021: https://publikationen.bibliothek.kit.edu/1000053685. 197 Pages.

International Search Report for PCT/EP2020/062704 Issued Aug. 3, 2020.

* cited by examiner

METHOD FOR OPTIMIZING A SURROUNDINGS MODEL

FIELD

The present invention relates to a method for optimizing a surroundings model by at least one control unit. The present invention furthermore relates to a control unit, to a computer program, and to a machine-readable memory medium.

BACKGROUND INFORMATION

Various sensors are used in vehicles operable in an automated manner for the recognition and classification of static and dynamic objects. For example, camera sensors, radar sensors, ultrasonic sensors and inertial sensors are used. These sensors allow a modeling of the immediate local surroundings of the vehicles, which is often combined with map data. In this way, the implementation of long-term driving maneuvers of the vehicles is made possible.

To create such a surroundings model, measured data of multiple sensors of a vehicle are fused. However, the operating mode of the various sensors results in a surroundings model which is subject to errors or subject to inaccuracies and which, for a precise long-term implementation of driving maneuvers, must be as realistic as possible.

In particular, the absence of references for checking the correctness of the created surroundings model and the accuracy of the sensor-based ascertained measured data, on which the surroundings model is based, is problematic.

SUMMARY

An object of the present invention is to provide a method by which created surroundings models may be checked, and their accuracy improved.

This object may be achieved with the aid of the present invention. Advantageous example embodiments of the present invention are disclosed herein.

According to one aspect of the present invention, a method for optimizing a surroundings model by at least one control unit is provided. The control unit may, for example, be a vehicle-external control unit, which is designed as a server unit or as a cloud system. As an alternative or in addition, the control unit may be a control unit situated vehicle-internally.

In accordance with an example embodiment of the present invention, in one step, measured data are received from a first sensor set and at least one second sensor set. The first sensor set preferably includes a first scanning area, and the second sensor set preferably includes a second scanning area, it being possible for the first scanning area and the second scanning area to partially overlap in an overlap area. Depending on the design and application, the scanning areas of the particular sensor sets may also be usable for carrying out the method without an overlap or the overlap area.

For each sensor set, a surroundings model is created based on the received measured data of the particular sensor set. As an alternative or in addition, a surroundings model may be created based on measured data of multiple sensor sets.

In one further step of the method, the at least two surroundings models are compared to one another based on the overlap area and verified.

Thereafter, the at least two surroundings models are combined into an optimized surroundings model.

According to another aspect of the present invention, a control unit is provided, the control unit being configured to carry out the method. For example, the control unit may be a vehicle-internal or a vehicle-external control unit. For example, the control unit which is designed to be vehicle-external may be able to receive and evaluate measured data from vehicles to verify and optimize the surroundings models.

In accordance with an example embodiment of the present invention, a control unit configured to be vehicle-internal may, for example, be connected to a vehicle control unit for carrying out automated driving functions or designed as a part of the automated vehicle control unit. In this way, the control unit may access measured data of the sensors used in the vehicle and the created surroundings models. Moreover, the control unit may include a communication unit for establishing data-conducting communication links to other vehicles or to control units of other vehicles.

According to one aspect of the present invention, moreover a computer program is provided, encompassing commands which, during the execution of the computer program by a computer or a control unit, prompt the computer to carry out the method according to the present invention. According to another aspect of the present invention, a machine-readable memory medium is provided, on which the computer program according to the present invention is stored.

The control unit designed to be vehicle-internal is situated in a vehicle, for example, which may be operable in an assisted, semi-automated, highly automated and/or fully automated or driverless manner according to the BASt standard.

A sensor set may be made up of one or multiple sensor(s). The sensors may be differently or identically configured. In particular, the sensors may be an integral part of a surroundings sensor system of a vehicle. In particular, the sensor set may include LIDAR sensors, radar sensors, ultrasonic sensors, camera sensors, and the like. The sensor set may also represent a part, a group of the surroundings sensor system or the entire surroundings sensor system. Moreover, further sensors, such as for example acceleration sensors or odometers, may be implemented in the sensor set.

In accordance with an example embodiment of the present invention, a redundancy of measured data may be created in the overlap area by the method, which allows the particular surroundings models to be checked and optimized. For example, when deviations are established between the surroundings models in the overlap area, a check may be initiated or an averaging of the measured data may be carried out to achieve an optimization. In particular, the at least two created surroundings models may be combined into an optimized surroundings model, which may map a larger territory or a larger scanning area. Due to the overlap area, the optimized surroundings model may already include an optimization or a verification of the particular measured data. In the process, either the measured data underlying the surroundings models or the resulting optimal surroundings model may be adapted.

In this way, a reference may be provided for checking and optimizing a performance capability of the sensor set. In particular, the method may be carried out by multiple sensor sets operated in parallel. The particular sensor sets may preferably be spatially spaced apart from one another. The sensor sets may particularly preferably have orientations of the scanning areas which deviate from one another and may at least partially monitor an identical scene or the overlap area of the particular scanning areas. Measured data ascertained on such a redundant basis may be used to create an optimized surroundings model, which is able to map sensor surroundings more realistically. As an alternative or in addition, a larger surface area may be mapped by the resulting surroundings model due to the use of the measured data of multiple sensor sets. The mapped surface area may optionally also be designed without the overlap area. The pieces of information or the results of the surroundings model calculation may preferably be stored and used at a later point in time. The use of these pieces of information may, for example, be initiated when a vehicle is moving in a direction or into an area of one of the scanning areas of the sensor sets. This may take place, for example, during a lane change, a turning process, and the like.

The method may be used both on test tracks or away from public roads, and on public roads. Hidden or insufficiently visible objects as well as objects at a larger distance from a sensor set may be scanned or detected by one or multiple sensor set(s) situated closer. By combining the pieces of information obtained with the aid of different sensor sets, an optimized surroundings model may be generated, which serves as a reference for other surroundings models. In particular, an optimized surroundings model having a reduced uncertainty may be created through the fusion of measured data or pieces of information of multiple spatially close sensor sets, which are situated, for example, on vehicles.

According to one exemplary embodiment of the present invention, the at least two sensor sets are situated in one vehicle or in different vehicles. In this way, the at least two sensor sets may have different positions and different orientations, so that the respective scanning areas differ from one another, except for a shared overlap area. In this way, for example, the surroundings model of a first sensor set, which is based on measured data from the first scanning area, may be expanded by the surroundings model of a second sensor set, which is based on measured data from the second scanning area. In this way, an arbitrarily long sequence of surroundings models may be implemented, it being possible for at least two surroundings models to partially overlap. Based on these synchronized pieces of information and measured data, which are based on an early sensor level, such as for example positions or reflections of LIDAR sensors, the optimized surroundings model may be created, which due to the spatial separation of the vehicles or sensor sets and/or due to a different viewing angle of the sensor sets and/or specific sensor characteristics has a higher accuracy than the surroundings models of the individual sensor sets or vehicles.

As a result of this measure, the errors of the individual surroundings models may be ascertained and optimized. This principle may also be employed in series or in succession, when multiple vehicles or sensor sets operate with compatible and transmissible input data, so that an individual vehicle has more input data available to discern its surroundings. Moreover, a vehicle may include multiple sensor sets to uncover possible systematic errors of individual sensor sets. In particular, the uncertainty or faultiness of the surroundings model may be decreased by supplying multiple, more diverse pieces of information.

According to another exemplary embodiment of the present invention, an inaccuracy of the received measured data in the overlap area is reduced by combining the at least two surroundings models. The surroundings models may be verified based on a comparison of the resulting surroundings models in the overlap area. If, for example, a deviation of the results exists, a check or a recalculation of the surroundings models may be initiated. As an alternative or in addition, an average value may be formed of the surroundings models, or an offset to compensate for deviations may be taken into consideration, to create an optimized surroundings model.

According to another specific embodiment of the present invention, as a result of the combination of the at least two surroundings models, an expanded scanning area is mapped by the optimized surroundings model, which corresponds to the first scanning area and the second scanning area. In addition, the respective surroundings models may be interpolated beyond the scanning areas to carry out a prediction. The sensor sets may preferably be situated on vehicles, each vehicle including a control unit connectable to the particular sensor sets. The control units may communicate with one another across vehicles and, for example, exchange measured data and surroundings models with one another. In this way, a synchronization of measured data and pieces of information between the vehicles may be implemented, which results in an increase in the possible range of the particular sensor sets and the precision of the surroundings models.

According to another exemplary embodiment of the present invention, the measured data of at least two sensor sets and/or data of at least two surroundings models are exchanged between at least two control units via a communication link. The respective sensor sets are preferably connected to control units. Depending on the design, a control unit may also be an integral part of a sensor set. Multiple control units may exchange data and pieces of information, such as for example measured data, surroundings models and calculation results, among one another via wireless communication links. The communication link may, for example, be based on a GSM, UMTS, LTE, 4G, 5G, WLAN, radio and the like transmission standard.

According to another exemplary embodiment of the present invention, a comparison, verification and/or combination of the at least two surroundings models into an optimized surroundings model is/are carried out by at least one vehicle-external or vehicle-internal control unit. In this way, the pieces of information of the different sensor sets or vehicles may be exchanged or synchronized continuously during a trip or at defined time intervals. As an alternative or in addition, the measured data and surroundings models of the different sensor sets may be transmitted to a vehicle-external control unit, which subsequently checks and verifies the particular surroundings models and measured data. In this way, an optimized surroundings model may be created external to the vehicle as a reference model for other vehicles and sensor sets.

According to one further embodiment of the present invention, the surroundings model of the first sensor set and/or the surroundings model of the second sensor set is/are completed, corrected and/or expanded by combining the at least two surroundings models. In this way, it is possible to ascertain errors of the individual surroundings models and to carry out a correction, a compensation, or an optimization. For this purpose, for example, parameters of the surroundings models may be adapted, or the measured data underlying the creation of the particular surroundings models may be corrected.

The measured data and/or the surroundings models of the different sensor sets may preferably have an identical time basis. The shared time basis may, for example, be set by GPS signals or a shared clock-pulse generator.

Preferred exemplary embodiments of the present invention are described in greater detail hereafter based on highly simplified schematic representations.

DETAILED DESCRIPTION OF EXAMPLE EMBODIMENTS

Figure 1:
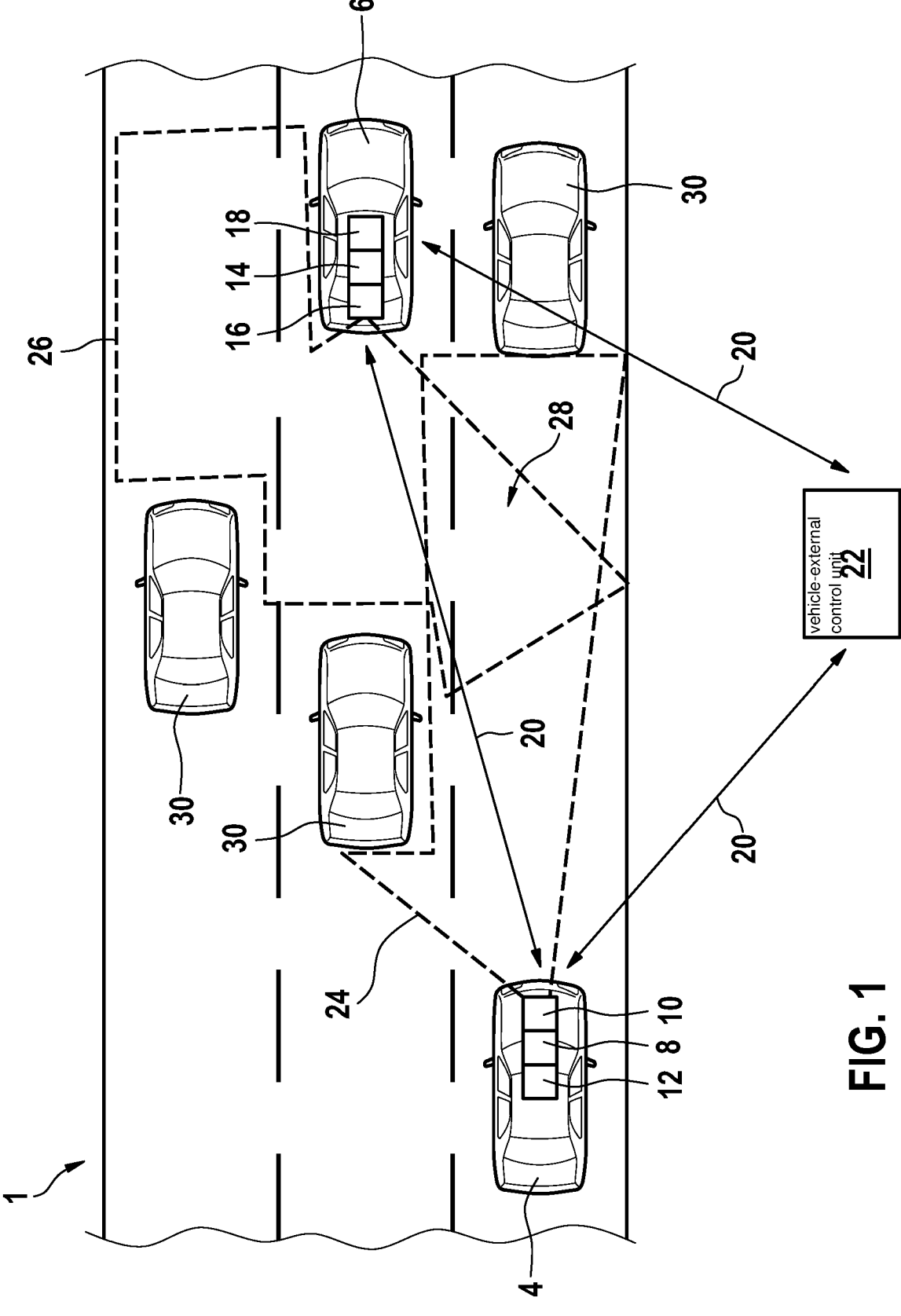
FIG. 1 shows a schematic top view onto a system for illustrating a method according to an example embodiment of the present invention.

FIG. 1 shows a schematic top view onto a system 1 for illustrating a method 2 according to the present invention. System 1 includes a first vehicle 4 and a second vehicle 6. Both vehicles 4, 6 may be designed as vehicles operable in an automated manner, which create a surroundings model for planning and carrying out actions. Two vehicles 4, 6 are shown for illustration purposes, however system 1 may include an arbitrary number of vehicles.

First vehicle 4 includes a first control unit 8. First control unit 8 is connected to a first sensor set 10. First sensor set 10 may, for example, include a LIDAR sensor and one or multiple radar sensor(s). Control unit 8 may, in particular, receive and evaluate measured data of first sensor set 10.

Moreover, first control unit 8 is connected to a machine-readable memory medium 12, which is used to store data and on which, for example, a computer program executable by first control unit 8 may be stored to carry out method 2.

Second vehicle 6 includes a second control unit 14, which is connected to a second sensor set 16 in a data-conducting manner. In this way, second control unit 14 may receive measured data from second sensor set 16.

According to the exemplary embodiment, second sensor set 16 is situated at the rear of second vehicle 6. Furthermore, a second machine-readable memory medium 18 is provided, which is readable by second control unit 14.

Second machine-readable memory medium 18 may be configured similarly to first machine-readable memory medium 12. For example, second sensor set 16 may include LIDAR sensors and camera sensors.

The two control units 8, 14 may exchange data and pieces of information with one another via a wireless communication link 20. Moreover, control units 8, 14 may communicate with a vehicle-external control unit 22 via wireless communication link 20 and also exchange data and pieces of information.

First sensor set 10 is configured to scan a first scanning area 24. A second scanning area 26 is scanned by second sensor set 16. First scanning area 24 and second scanning area 26 include an overlap area 28 in which they overlap one another. The measured data of sensor sets 10, 16 are thus present redundantly in overlap area 28.

Scanning areas 24, 26 are partially concealed or shadowed by adjoining vehicles 30. Scanning areas 24, 26 and the effect of vehicles 30 are schematically illustrated.

Figure 2:
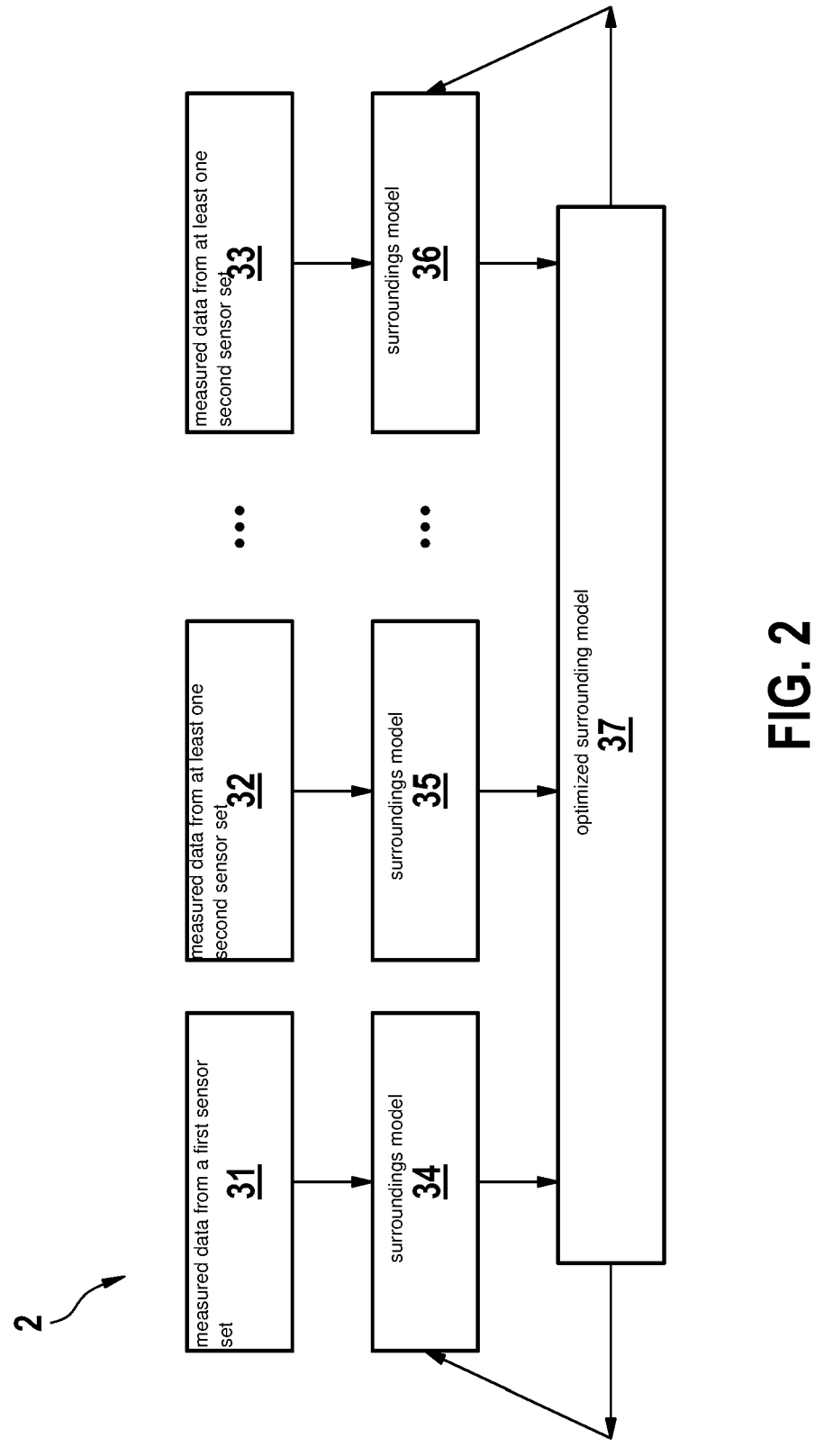
FIG. 2 shows a schematic diagram for illustrating the method according to one exemplary embodiment of the present invention.

FIG. 2 shows a schematic diagram for illustrating method 2 according to one exemplary embodiment. Method 2 is used to optimize a surroundings model by at least one control unit 8, 14, 22.

In one step, measured data 31 are received from a first sensor set 10 and measured data 32, 33 are received from at least one second sensor set 16. According to the exemplary embodiment, the measured data are exchanged between control units 8, 14, 22 via a communication link 20. Communication link 20 may, for example, be a WLAN, GSM, LTE or a similar wireless link. The measured data preferably have a shared time basis or are ascertained in a synchronized manner.

Sensor sets 10, 16 each include a scanning area 24, 26, which overlap in an overlap area 28.

In one further step, a surroundings model 34, 35, 36 is created for each sensor set 10, 16 based on the received measured data 31, 32, 33 of the particular sensor set 10, 16. This may take place by the vehicle-side control units 8, 14.

The at least two surroundings models 34, 35, 36 are, for example, compared to one another based on overlap area 28 and are verified. In particular, an overlap area between the first two surroundings models 34, 35 and an overlap area between every further pair of surroundings models 35, 36 may be used for the comparison and verification.

In the process, a comparison, verification and/or combination of the at least two surroundings models 34, 35, 36 result(s) in an optimized surroundings model 37. This step may be carried out by the vehicle-side control units 8, 14 or by the vehicle-external control unit 22. In this way, the at least two surroundings models 34, 35, 36 may be combined into an optimized surroundings model 37.

The arrows illustrate a possible feedback of the optimized surroundings model 37 to improve the respective surroundings models 34, 35, 36 of sensor set 10, 16.

What is claimed is:

1. A method of a first vehicle, the method comprising:

generating, by a sensor set of the first vehicle, measured data of current immediate surroundings of the first vehicle that are within a scanning range of the first sensor set, wherein an original version of a first surroundings model of the surroundings of the first vehicle is generated based on the measured data generated by the first sensor set, and wherein the first vehicle is configured for automated vehicle control based on the first surroundings model representing the current immediate surroundings of the first vehicle;

wirelessly transmitting, by the first vehicle, the measured data generated by the first sensor set or the original version of the first surroundings model to a central processing unit that functions as a vehicle-external control unit, wherein:

the central processing unit is configured to modify the first surroundings model based on a second surroundings model, thereby obtaining an updated version of the first surroundings model;

the second surroundings model is generated based on measured data from a second sensor set of a second vehicle sensing surroundings of the other vehicle that are within a scanning range of the second sensor set;

the scanning range of the first sensor set and the scanning range of the second sensor set partially overlap each other, the overlap occurring in an overlap area; and the modification of the first surroundings model is based on a discrepancy between the original version of the first surroundings model and the second surroundings model corresponding to the overlap area;

receiving, by a control unit of the first vehicle, the updated version of the first surroundings model from the central processing unit; and controlling, by the control unit of the first vehicle, an automated driving operation of the first vehicle based on the updated version of the first surroundings model, such that the automated driving operation is based on a representation of the current immediate surroundings of the first vehicle that differs from the representation, by the first surroundings model generated from measured data of the first vehicle's own sensor set, of the current immediate surroundings of the first vehicle.

2. The method as recited in claim 1, wherein the modification reduces an inaccuracy of the measured data generated by the first sensor set at least in the overlap area by combining the first and second surroundings models.

3. The method as recited in claim 1, wherein, as a result of the modification of the first surroundings model, an expanded scanning area is mapped by the updated version of the first surroundings model, which corresponds to an area covered by a combination of the first scanning area and the second scanning area.

4. The method of claim 1, wherein:

the second sensor set is mounted on the second vehicle that is different from the first vehicle;

the measured data used to generate the second surroundings model is sensor data collected by the second sensor set; and the central processing unit is configured to:

receive the sensor data collected by the second sensor set;

generate the second surroundings model based on the received sensor data from the second sensor set;

subsequently use the second surroundings model and the first surroundings model to determine the discrepancy in the overlap area;

based on the discrepancy, modify the first surroundings model to obtain the updated version of the first surroundings model; and transmit the updated version of the first surroundings model to the first vehicle, which performs the controlling of the automated driving operation based on the updated version of the first surroundings model as received from the central processing unit.

5. The method of claim 1, wherein:

the second sensor set is mounted on the second vehicle that is different from the first vehicle;

the measured data used to generate the second surroundings model is sensor data collected by the second sensor set; and the second vehicle is configured to generate the second surroundings model based on the measured data and subsequently transmit the generated second surroundings model to the central processing unit; and the central processing unit is configured to:

receive, from the second vehicle, the generated second surroundings model that the second vehicle has transmitted;

subsequently use the second surroundings model and the first surroundings model to determine the discrepancy in the overlap area;

based on the discrepancy, modify the first surroundings model to obtain the updated version of the first surroundings model; and transmit the updated version of the first surroundings model to the first vehicle, which performs the controlling of the automated driving operation based on the updated version of the first surroundings model as received from the central processing unit.

6. A system of a first vehicle, the system comprising:

a sensor set; and a control unit, wherein:

the sensor set is configured to generate measured data of current immediate surroundings of the first vehicle that are within a scanning range of the first sensor set, wherein an original version of a first surroundings model of the surroundings of the first vehicle is generated based on the measured data generated by the first sensor set, and wherein the first vehicle is configured for automated vehicle control based on the first surroundings model representing the current immediate surroundings of the first vehicle;

the control unit is configured to wirelessly transmit the measured data generated by the first sensor set or the original version of the first surroundings model to a central processing unit that functions as a vehicle-external control unit;

the central processing unit, to which the wireless transmission is made, is configured to modify the first surroundings model based on a second surroundings model, thereby obtaining an updated version of the first surroundings model;

the second surroundings model is generated based on measured data from a second sensor set of a second vehicle sensing surroundings of the other vehicle that are within a scanning range of the second sensor set;

the scanning range of the first sensor set and the scanning range of the second sensor set partially overlap each other, the overlap occurring in an overlap area;

the modification of the first surroundings model is based on a discrepancy between the original version of the first surroundings model and the second surroundings model corresponding to the overlap area; and the control unit is configured to:

receive the updated version of the first surroundings model from the central processing unit; and control an automated driving operation of the first vehicle based on the updated version of the first surroundings model, such that the automated driving operation is based on a representation of the current immediate surroundings of the first vehicle that differs from the representation, by the first surroundings model generated from measured data of the first vehicle's own sensor set, of the current immediate surroundings of the first vehicle.

7. A non-transitory machine-readable memory medium on which is stored a computer program that is executable by computer of a first vehicle and that, when executed by the computer, causes the computer to perform the following:

obtaining, from a sensor set of the first vehicle, measured data of surroundings of the first vehicle that are within a scanning range of the first sensor set, wherein an original version of a first surroundings model of the surroundings of the first vehicle is generated based on the measured data generated by the first sensor set, and wherein the first vehicle is configured for automated vehicle control based on the first surroundings model representing the current immediate surroundings of the first vehicle;

wirelessly transmitting the measured data generated by the first sensor set or the original version of the first surroundings model to a central processing unit that functions as a vehicle-external control unit, wherein:

the central processing unit is configured to modify the first surroundings model based on a second surroundings model, thereby obtaining an updated version of the first surroundings model;

the second surroundings model is generated based on measured data from a second sensor set of a second vehicle sensing surroundings of the other vehicle that are within a scanning range of the second sensor set;

the scanning range of the first sensor set and the scanning range of the second sensor set partially overlap each other, the overlap occurring in an overlap area; and the modification of the first surroundings model is based on a discrepancy between the original version of the first surroundings model and the second surroundings model corresponding to the overlap area;

receiving the updated version of the first surroundings model from the central processing unit; and controlling an automated driving operation of the first vehicle based on the updated version of the first surroundings model, such that the automated driving operation is based on a representation of the current immediate surroundings of the first vehicle that differs from the representation, by the first surroundings model generated from measured data of the first vehicle's own sensor set, of the current immediate surroundings of the first vehicle.

* * * * *